Sept. 17, 1957 R. COOPER 2,806,276
CLAMP ASSEMBLY
Filed Aug. 4, 1954
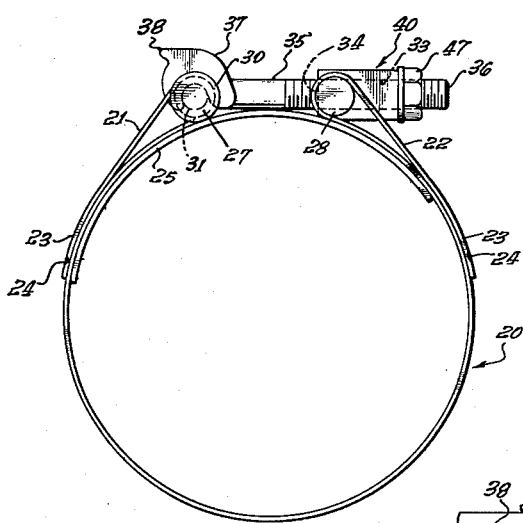
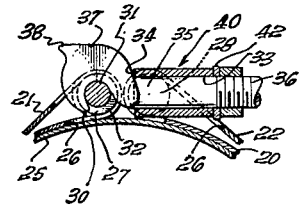
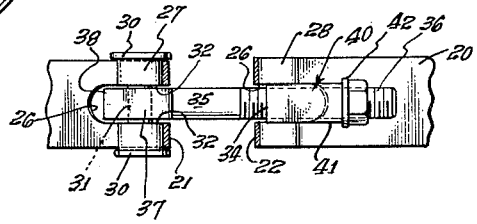
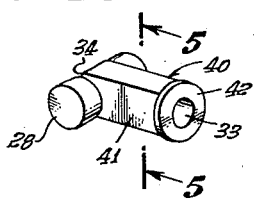
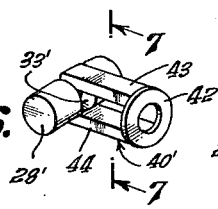
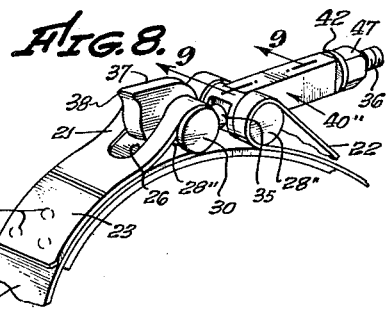
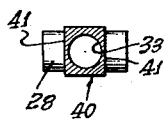
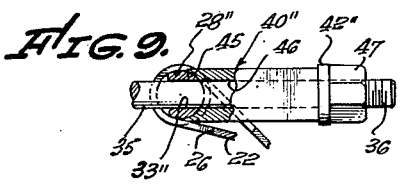
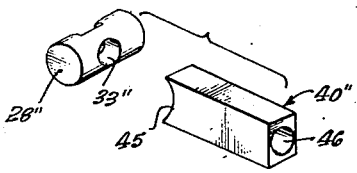
ROBERT COOPER,
INVENTOR.
BY
ATTORNEY.

United States Patent Office 2,806,276
Patented Sept. 17, 1957

2,806,276
CLAMP ASSEMBLY

Robert Cooper, Los Angeles, Calif., assignor to Awica Products, Inc., a corporation of California Application August 4, 1954, Serial No. 447,778

9 Claims. (Cl. 24—279)

The present invention relates generally to clamping devices and relates more specifically to clamping devices for use with hoses or the like.

The present application is a continuation-in-part of application Serial No. 351,319, filed April 27, 1953.

With hose clamps, or the like, heretofore such devices have been unnecessarily complex and often of such a nature as to prohibit ready access thereto for manipulation and/or adjustment within confined spaces. Furthermore, prior devices have failed to provide the necessary mechanism, in conjunction with hose clamps or the like, to enable rapid, accurate, and efficient placement thereof in operative position about a hose.

When hose clamps are utilized in some particular installations, such for example, as on aircraft, it becomes necessary that the mechanism associated therewith be light weight and of such configuration as to enable placemen in confined spaces without unnecessary protuberances which may be in the way of adjacently disposed aircraft components, ducting or other hose clamps. Prior attempts at weight reduction in hose clamps have met with weakened structural components and inherent inability of such prior devices effectively to perform a clamping operation about a hose. Accordingly, it becomes necessary that hose clamps, for use in such installations requiring light-weight structures, be mechanically sound and be possessed of operational components sufficient to perform the clamping operation while still maintaining light-weight parts and closely fitting cooperable elements.

Accordingly, it is an object of the present invention to provide an improved hose clamp having novel means permitting placement thereof in confined spaces and enabling adjustment and/or manipulation in such confined spaces.

It is a further object of the present invention to provide an improved hose clamp having compactly arranged, closely fitting components that are light in weight while still retaining the necessary strength to enable performance of the desired clamping operation.

It is another important object of the invention to provide a hose clamp of the character described wherein bifurcated loop portions support a pair of trunnion members with a hook-bolt member being operatively disposed between the trunnion members, there being novel means for supporting the hook-bolt member and permitting adjustment thereof relative to the trunnion members.

It is still another object of the present invention to provide a hose-clamp mechanism having novel means for moving opposite ends of a clamp toward each other, such means being generally rectangular in cross-section and closely fitted with respect to other portions of the hose clamp, thereby to permit greater strength thereof and disposition within a more restricted space than has heretofore been experienced with prior similar arrangements.

Other and further objects of the present invention will become apparent from the disclosures in the following detailed specification, appended claims and accompanying drawing, wherein:

Figure 1 is a front elevational view of the hose clamp of the present invention;

Fig. 2 is a fragmentary sectional view of a portion of the operating mechanism utilized with the present hose clamp, with components in different positions than as viewed in Fig. 1;

Fig. 3 is an enlarged fragmentary top plan view, partially in section, showing the operating mechanism for the present hose clamp;

Fig. 4 is a perspective view showing one of the trunnions and guide arrangement for use with the hook bolt in the operating mechanism of the present invention;

Fig. 5 is a sectional view through the guide member, as taken substantially as indicated by line 5—5, Fig. 4;

Fig. 6 is a perspective view showing another form of guide member and trunnion combination;

Fig. 7 is a sectional view through the modified form of guide member as taken substantially as indicated by line 7—7, Fig. 6;

Fig. 8 is a fragmentary perspective view showing the operating mechanism of a further modified form of the present hose clamp with portions thereof drawn up into a clamping position;

Fig. 9 is a fragmentary sectional view showing the connection between one of the trunnions and the hook-bolt guide member as taken substantially as indicated by line 9—9, Fig 8; and Fig. 10 is an exploded perspective view showing one form of combination trunnion member and hook-bolt guide member utilized with the present hose clamp device.

Referring to the drawing, the hose clamp of the present invention comprises a flexible metallic band 20 that is disposed in a substantially circular configuration. Opposite ends of the band 20 are folded back upon themselves, thereby forming loops 21 and 22 with the end portions 23 of the band being secured to the body portion thereof as by any suitable means, such as for example, riveting, spot welding, or the like, as indicated at 24. A tongue 25 extends between the open ends of the band 20, along the inner surface thereof, and overlies the loops 21 and 22. The tongue 25 may be secured at one end to the band 20, such as by the spot welding at 24. In accordance with the present invention, the spot welding 24 or other suitable similar securing means, is located at or beyond points where the band, when connected, is tangent to the circumference of a wrapped connection.

As shown primarily in Figs. 3 and 8, the loops 21 and 22 are bifurcated as by circumferential slots 26 formed in the opposed ends of the loops 21 and 22. The slots 26 have parallel sides and rounded end portions for a purpose to be hereinafter more fully described and in order that adequate strength may be maintained in the loops 21 and 22 without the possibility of tearing or otherwise rupturing any squared corners therein.

A pair of first and second trunnions 27 and 28 are positioned in the open ends of the loops 21 and 22 respectively. The trunnion 27 has radially extending annular end flanges 30 that engage the outer surfaces of the loop 21 in order to maintain the trunnion in place therein. The trunnion 27 further has a reduced diameter central portion 31 and side portions 32. The opposed radially extending ends of the side portions 32 are co-planar with the radial planes formed by the side portions of the slot 26 in the loop 21.

The trunnion 28 has a transverse bore 33 therethrough and a groove 34 disposed normal to and communicating with the bore 33. The outer ends of the trunnion 28 are co-planar with the outer side surfaces of the loop 22.

A hook-bolt member 35 is slidably disposed in the bore 33 through the trunnion 28. One end of the hook-bolt member 35 is provided with a threaded stem portion 36, the other end being provided with a hook portion 37. The hook portion 37 is adapted to engage the reduced diameter portion 31 of the trunnion 27. The hook portion 37 is provided with an upwardly and outwardly extending finger engaging portion 38 in order to facilitate removal from the reduced diameter portion 31 from the trunnion 27. It is to be noted that the transverse sides of the hook portion 37 are in the form of flat sided walls having a radial width greater than the transverse width thereof, and that are closely received between the inner surfaces of the side portion 32 of the trunnion 27 and the side portions of the slot 26 formed in the loop 21. This particular construction enables close confining of the hook portion 37 in the bifurcated end of the loop 21 and about the portion 31 of the trunnion 27, maintains the sufficient strength necessary without resorting to extreme size, and provides a means by which the relatively wide surface is presented in the finger engaging portion 38, thus to enable adequate material in this area for finger engagement and strength purposes.

In order to guide the threaded stem portion 36 of the hook-bolt member 35, the trunnion member 28 may have a guide member 40 disposed in connection therewith. The guide member 40 may take several forms, as shown respectively in Figs. 1, 2, 3 and 4; Fig. 6; and Figs. 8, 9 and 10. In the first form of this portion of the invention, the guide member 40 is formed integrally with the trunnion 28, with the bore 33 extending through both the trunnion and guide member. The guide member is generally rectangular in cross-section, is disposed rearwardly from the outer surface of the trunnion 28, and closely confined by planes of side edges of the slot 26 in the loop 22. The guide member 40 further is provided with flat-sided walls 41 that extend above and below the outer surfaces of the rounded ends of the trunnion 28. The walls 41 are thereby wider than the internal radial width of the loop 22 and wider than the width of the slot 26. Additionally, the guide member 40 has a circular washer member 42 formed integrally in the rearward end thereof.

In the form of the combination trunnion and guide member shown in Figs. 6 and 7, the guide member portion is defined by upper and lower strips 43 and 44 that are formed integrally with or adapted to overlie a reduced area portion of a trunnion 28'. The rearward end of the strips 43 and 44 are connected as by a washer member 42'. In this form of the invention there is some weight saving over the configuration of Fig. 4 without sacrifice of strength.

In the form of trunnion member shown in Figs. 8, 9 and 10, a box-like guide member 40" is formed separately from a trunnion 28". The forward end 45 of the guide member 40" is contoured so as to conform to the surface configuration of the trunnion 28". Guide member 40" is further provided with an elongated store 46 that is adapted for co-extensive relationship with a bore 33" formed in the trunnion 28". In this form of the invention, a washer member 42" may be made separate from the guide member 40" and adapted merely to abut a rearward surface of the guide member.

Regardless of which form of the guide member is utilized with the present invention, a takeup nut 47 is adapted threadably to engage the threaded stem 36 of the hook-bolt member 35 and to cooperate with the other surface of the washer member 42 in order thereby to urge the loops 21 and 22 circumferentially toward each other by action of the hook-bolt member between the trunnions 27 and 28.

In use of the present invention, the nut 47 will be moved toward the rearward end of the threaded stem portion 36 of the hook-bolt member 35 and the hook portion 37 will be released from its position about the reduced diameter portion 31 of the trunnion 27. The clamp member may thereafter be encircled about a hose or the like and the hook member 37 replaced about the reduced diameter portion 31. Thereafter, the nut 47 may be drawn inwardly along the threaded portion 36, thereby moving the inner surface of the loop 22 over the outer surface of the tongue 25 and moving the loops 21 and 22 closer to each other, thereby reducing the overall diameter of the band 20. It may be seen that the shank of the hook-bolt member 35 is adapted to engage the outer surface of the tongue 25 in order to bring these elements in as close as possible to the outer surface of the clamped structure. Additionally, it is to be noted that considerable strength is gained without sacrifice of either space or excessive weight by the particular configurations of both the hook portion 37 and the various types of guide members 40, 40' and 40". The flat side wall configuration of the hook portion 37 and various guide members enables relatively close confining of these members with respect to the trunnions 27 and 28, as hereinbefore described, permits ready operation of the hook portion 37, as by engagement in the area 38, and enables the establishment of as much material as possible within the available confined space.

Having thus described the invention and the present embodiments thereof, it is desired to emphasize the fact that many modifications may be made therein within the scope of the following claims:

I claim:

1. In a hose clamp: a band having first and second bifurcated looped ends, each of said ends being in the form of a looped slotted portion; first and second trunnions carried respectively by said first and second ends, said first trunnion having a reduced central portion with flat-sided walls substantially co-planar with the planes of the edges of the looped slot at said first end; an elongated guide member extended rearwardly from said second trunnion, said guide member having flat side walls that fit closely between the planes formed by the edges of the looped slot at said second looped end and that project rearwardly beyond the loop at said second end, said flat-sided walls having a width in the latter mentioned planes that is greater than the internal radial width of said second looped end in these planes; and a hook-bolt having a threaded stem extending rearwardly through said guide member and engaging a takeup nut on the rear end thereof, said hook-bolt having flat side walls and being adapted to hook the reduced portion of said first trunnion with the flat-sided walls fitting closely between the sides of the reduced portion of said first trunnion and between said first mentioned planes, said hook-bolt having a larger cross-section parallel to said first mentioned planes than transverse thereto.

2. A clamp as defined in claim 1 wherein said first trunnion is provided with end flanges for retaining said first trunnion in said first looped end.

3. In a hose clamp: a band having first and second separated ends, a hook bolt, said first end having a transverse member engageable by the hook-bolt, said second end being in the form of a bifurcated looped slotted portion; a trunnion carried by said second end; and an elongated guide member extending rearwardly from said trunnion, said guide member having flat side walls that fit closely between the planes formed by the edges of the looped slot at said second end and that project rearwardly beyond said loop at said second end, said hook-bolt having side walls having parts that are opposite the solid parts of said band that form said looped portion; a hook portion adapted to be hooked over said transverse member and a threaded stem extended rearwardly through said extension member and engaging a takeup nut on the rear end thereof.

4. A hose clamp as defined in claim 3 wherein the radial thickness of said guide member adjacent said trunnion is greater than the internal radial width of said looped end.

5. A hose clamp as defined in claim 3 wherein the radial thickness of said guide member adjacent said trunnion is greater than the distance between said walls.

6. A hose clamp as defined in claim 3 wherein the radial thickness of said guide member adjacent said trunnion is greater than the internal radial thickness of said looped end and is also greater than the distance between said walls.

7. In a hose clamp: a circular band having first and second separated ends, said first end being in the form of a bifurcated looped slotted portion; a trunnion carried by said first looped end, said trunnion having a reduced central portion with flat-sided walls substantially co-planar with the planes of the edges of the looped slot at said first end; a hook-bolt having flat-sided walls and being adapted to hook the reduced portion of said trunnion with the flat-sided walls fitting closely between the sides of the reduced portions of said trunnion and between said planes, said hook-bolt having a larger cross-section parallel to said plane than transverse thereto; and means at said second end for longitudinally moving said hook-bolt relative to said second end.

8. A hose clamp as defined in claim 7 wherein an extension is formed on the outer side of said hook-bolt to facilitate unhooking.

9. A hose clamp as defined in claim 7 wherein the outer side of said hook-bolt extends beyond the outer edge of said loop.

References Cited in the file of this patent

UNITED STATES PATENTS

| | | |
|---|---|---|
| 991,769 | Catelain | May 9, 1911 |
| 2,368,929 | King | Feb. 6, 1945 |